(12) United States Patent
Yao

(10) Patent No.: US 9,876,944 B2
(45) Date of Patent: Jan. 23, 2018

(54) APPARATUS, SYSTEMS AND METHODS FOR USER CONTROLLED SYNCHRONIZATION OF PRESENTED VIDEO AND AUDIO STREAMS

(71) Applicant: EchoStar Broadcasting Corporation, Englewood, CO (US)

(72) Inventor: Kevin Yao, Cheyenne, WY (US)

(73) Assignee: EchoStar Broadcasting Corporation, Englewood, CO (US)

( * ) Notice: Subject to any disclaimer, the term of this patent is extended or adjusted under 35 U.S.C. 154(b) by 0 days.

(21) Appl. No.: 15/679,972

(22) Filed: Aug. 17, 2017

(65) Prior Publication Data

US 2017/0346995 A1    Nov. 30, 2017

Related U.S. Application Data

(62) Division of application No. 14/689,858, filed on Apr. 17, 2015, now Pat. No. 9,742,965, which is a division of application No. 13/179,359, filed on Jul. 8, 2011, now Pat. No. 9,013,632.

(60) Provisional application No. 61/362,498, filed on Jul. 8, 2010.

(51) Int. Cl.
| | |
|---|---|
| *H04N 5/06* | (2006.01) |
| *H04N 21/442* | (2011.01) |
| *H04N 21/431* | (2011.01) |
| *H04N 21/43* | (2011.01) |
| *H04N 5/04* | (2006.01) |
| *H04L 29/06* | (2006.01) |
| *H04N 21/434* | (2011.01) |

(52) U.S. Cl.
CPC ............ *H04N 5/06* (2013.01); *H04L 65/60* (2013.01); *H04N 21/431* (2013.01); *H04N 21/4307* (2013.01); *H04N 21/4341* (2013.01); *H04N 21/44222* (2013.01); *H04N 5/04* (2013.01)

(58) Field of Classification Search
CPC ........ H04N 5/06; H04N 5/04; H04N 21/4307; H04N 21/431; H04N 21/4341; H04N 21/44222; H04L 65/60
See application file for complete search history.

(56) References Cited

U.S. PATENT DOCUMENTS

| | | | |
|---|---|---|---|
| 5,596,420 | A | 1/1997 | Daum |
| 5,664,044 | A | 9/1997 | Ware |
| 6,262,776 | B1 | 7/2001 | Griffits |
| 7,634,227 | B2 | 12/2009 | de Jong |
| 7,636,126 | B2 | 12/2009 | Mallinson |

(Continued)

FOREIGN PATENT DOCUMENTS

| | | |
|---|---|---|
| EP | 1662793 A1 | 5/2006 |
| EP | 1720339 A2 | 11/2006 |

(Continued)

*Primary Examiner* — Michael Teitelbaum
(74) *Attorney, Agent, or Firm* — Lowe Graham Jones PLLC

(57) ABSTRACT

Systems and methods are operable to correct synchronization between a video stream and an audio stream presented to a user. An exemplary embodiment receives a synchronization correction instruction, wherein the synchronization correction is configured to be initiated by the user; and incrementally adjusts one of the video stream and the audio stream by a synchronization correction, wherein the synchronization correction advances or retards presentation of at least one of the video stream and the audio stream by a predefined duration.

14 Claims, 2 Drawing Sheets

(56) References Cited

U.S. PATENT DOCUMENTS

| | | |
|---|---|---|
| 7,668,243 B2 | 2/2010 | Ho et al. |
| 7,920,209 B2 | 4/2011 | Mallinson |
| 8,102,836 B2 | 1/2012 | Jerlhagen et al. |
| 8,199,780 B2 | 6/2012 | Gha et al. |
| 8,284,310 B2 | 10/2012 | Mallinson |
| 8,325,930 B2 | 12/2012 | Kim et al. |
| 8,505,054 B1 | 8/2013 | Kirley |
| 8,743,284 B2 | 6/2014 | Russell et al. |
| 8,811,375 B2 | 8/2014 | Gha et al. |
| 2003/0179317 A1 | 9/2003 | Sigworth |
| 2010/0295993 A1 | 11/2010 | Oh |
| 2011/0187927 A1 | 8/2011 | Simon |
| 2011/0302238 A1 | 12/2011 | Sood et al. |

FOREIGN PATENT DOCUMENTS

| | | |
|---|---|---|
| WO | 2009027128 A1 | 3/2009 |
| WO | 2010044318 A1 | 4/2010 |

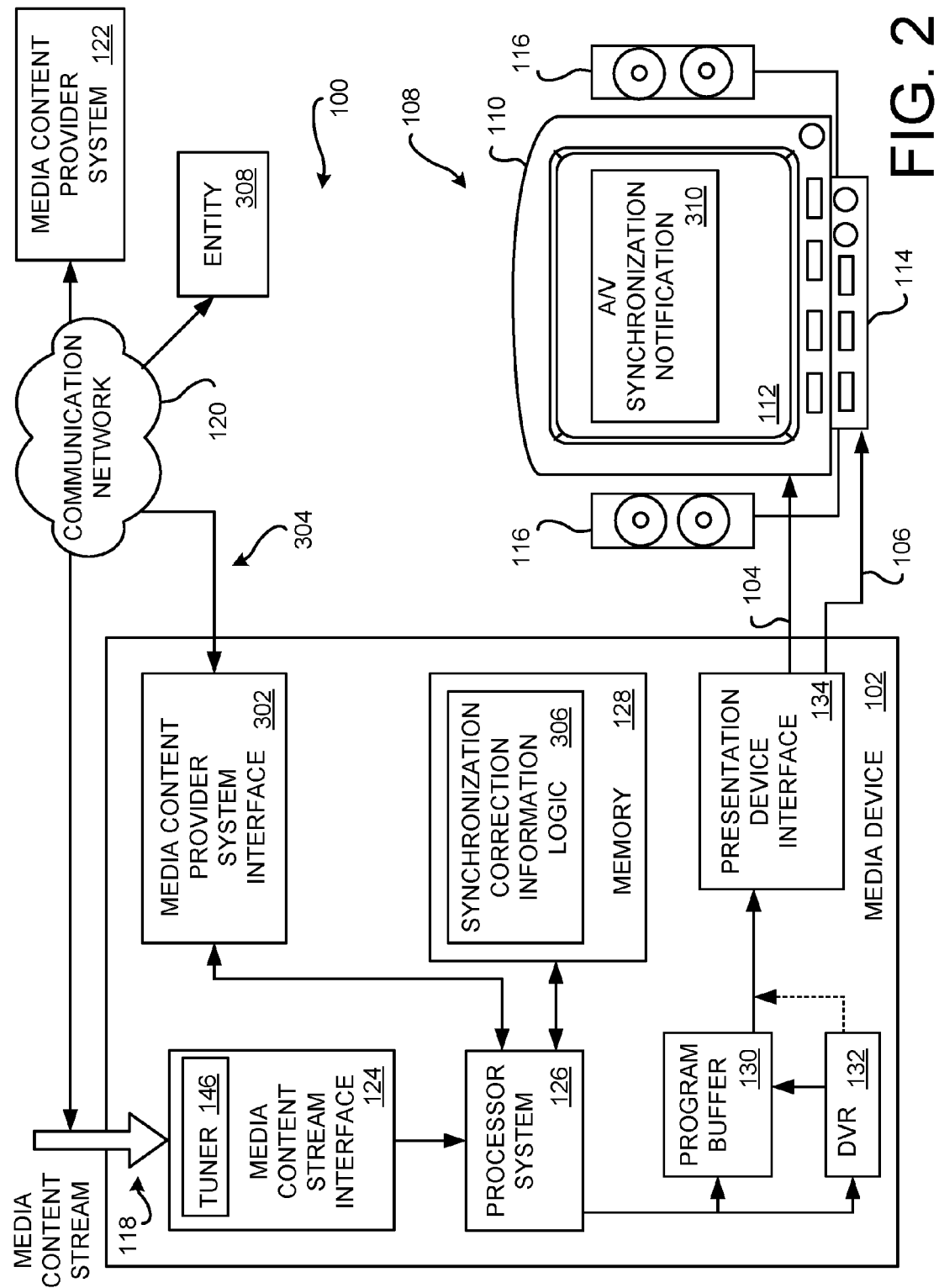

APPARATUS, SYSTEMS AND METHODS FOR USER CONTROLLED SYNCHRONIZATION OF PRESENTED VIDEO AND AUDIO STREAMS

CROSS REFERENCE TO RELATED APPLICATIONS

This application is a Divisional of U.S. application Ser. No. 14/689,858, filed Apr. 17, 2015, published as U.S. Publication No. 2015/0222791, and entitled "APPARATUS, SYSTEMS AND METHODS FOR USER CONTROLLED SYNCHRONIZATION OF PRESENTED VIDEO AND AUDIO STREAMS," and issued as U.S. Pat. No. 9,742,965 on Aug. 22, 2017, which claims priority to U.S. application Ser. No. 13/179,359, filed Jul. 8, 2011, published as U.S. Publication No. 2012/0008045, and entitled "APPARATUS, SYSTEMS AND METHODS FOR USER CONTROLLED SYNCHRONIZATION OF PRESENTED VIDEO AND AUDIO STREAMS," and issued as U.S. Pat. No. 9,013,632 on Apr. 21, 2015, which claims the benefit of and priority to U.S. Application Ser. No. 61/362,498, filed Jul. 8, 2010, entitled, "APPARATUS, SYSTEMS AND METHODS FOR USER CONTROLLED SYNCHRONIZATION OF PRESENTED VIDEO AND AUDIO STREAMS," the content of which are entirely incorporated herein by reference.

BACKGROUND

Media devices, such as a set top box, are configured to receive media content. The received media content may be presented on a media presentation device, such as a television, computer system, monitor, or the like. The media content, such as a television program, a broadcast sports event, a movie, or the like, is received in the form of a video stream and an associated audio stream. The video stream and the audio stream are temporally synchronized with each other. Once received and processed, the video stream is presented on a display and the audio stream is output from one or more speakers in a synchronized fashion. For example, an actor in a program or movie is viewable on the display. The actor's dialogue is heard by the viewer, where the dialogue is synchronized with the apparent speech movements of the actor.

However, the synchronization between the video stream and the audio stream may not be exact. In such situations, a viewer will perceive that the movement of the actor's lips when speaking does not exactly correspond to the dialogue that is being heard by the viewer. Other events in a movie may be associated with expected sounds. For example, an explosion scene from the video stream can be expected to have an attendant explosion sound in the audio stream. If the synchronization between the video stream and the audio stream is not exact, then the user will perceive the discrepancy between the presented image of the explosion and their hearing of the explosion sound, which will be heard at a time that does not correspond to the viewed image of the explosion.

Many different "lip-sync" or "lip-synchronism" systems have been developed to correct the lip-sync problem. However, such lip-sync correction systems and methods are based on the signal characteristics of the voice and audio streams, and/or are based on various clocking or timing signals associated with the video and audio streams.

Ultimately, the user of the media presentation system perceives the success, or failure, of such lip-sync correction systems and methods. If the lip-sync correction systems and methods fail to perform as intended, the user perceives the unsynchronized presentation of the video and audio streams. Such unsynchronized presentation of the video stream and the audio stream may be very distracting to the user.

Unfortunately, the user is not able to correct an apparent unsynchronized presentation of the video and audio streams. Accordingly, there is a need in the arts to permit the user to synchronize presentation of a presented video stream and a presented audio stream.

SUMMARY

Systems and methods of correcting synchronization between a video stream and an audio stream presented to a user are disclosed. An exemplary embodiment receives a synchronization correction instruction, wherein the synchronization correction is configured to be initiated by the user; and incrementally adjusts one of the video stream and the audio stream by a synchronization correction, wherein the synchronization correction advances or retards presentation of at least one of the video stream and the audio stream by a predefined duration.

BRIEF DESCRIPTION OF THE DRAWINGS

Preferred and alternative embodiments are described in detail below with reference to the following drawings:

FIG. 2 is a block diagram of an alternative embodiment of the video and audio synchronization system that is configured to support communications between the media device and the media content provider system concerning unsynchronized presentation of the video stream and the audio stream.

DETAILED DESCRIPTION

Figure 1:
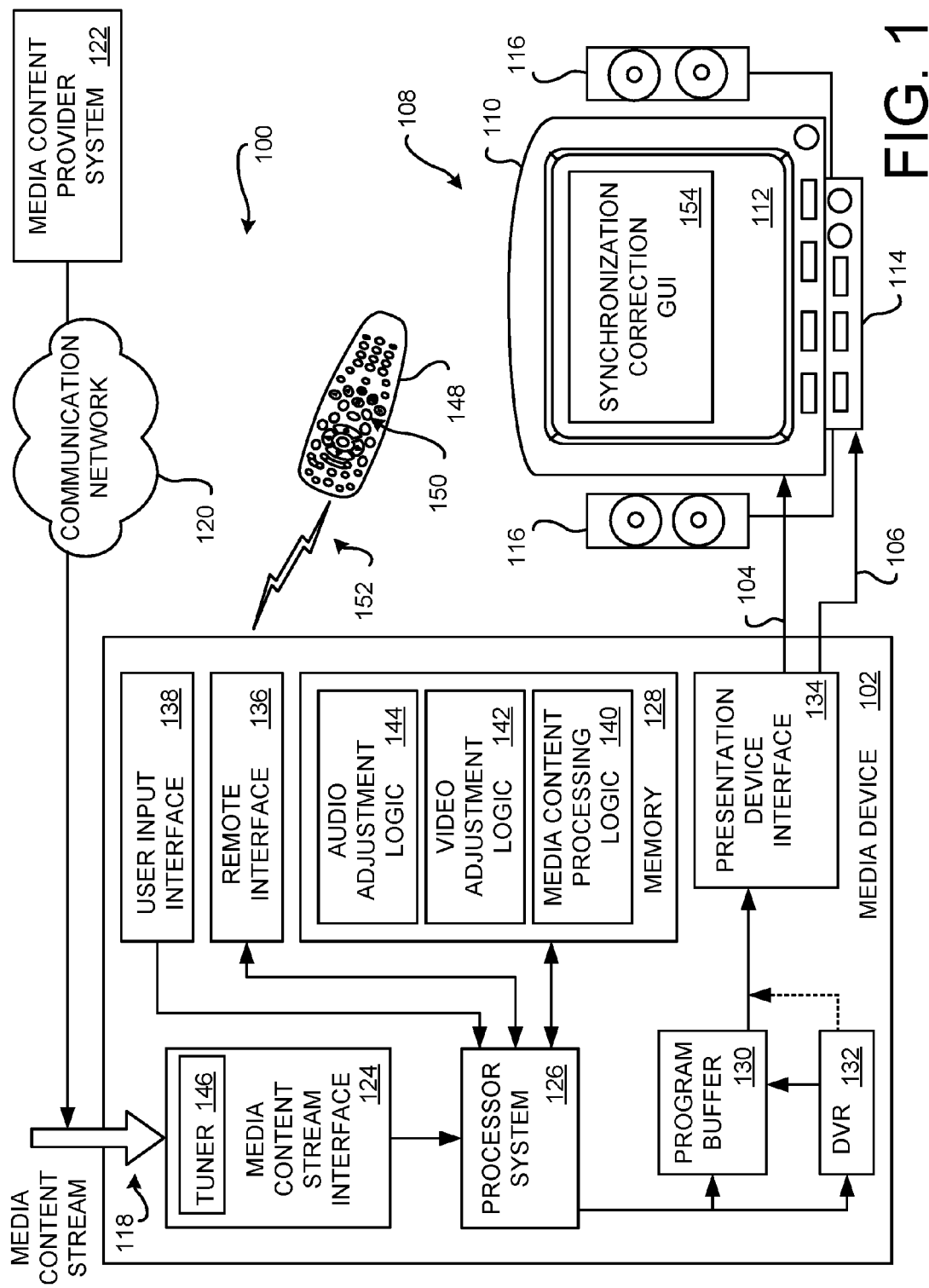
FIG. 1 is a block diagram of an embodiment of a video and audio synchronization system.

FIG. 1 is a block diagram of an embodiment of a video and audio synchronization system 100 implemented in a media device 102, such as, but not limited to, a set top box (STB). Embodiments of the video and audio synchronization system 100 may be implemented in other media devices, such as, but not limited to, stereos, surround-sound receivers, radios, televisions (TVs), digital video disc (DVD) players, digital video recorders (DVRs), game playing devices, or personal computers (PCs) that are configured to generate, provide, and/or to present a video stream 104 and/or an audio stream 106.

The synchronized video stream 104 and the audio stream 106 may be presented on one or more suitable presentation devices 108. For example, the illustrated media device 102 is communicatively coupled to a television 110 that presents the video stream 104 on its display 112 (and optionally, may also present the audio stream on its speakers). Alternatively, or additionally, the media device 102 may be communicatively coupled to a sound system 114 that emits the audio stream 106 on its speakers 116. Examples of the sound system 114 include, but are not limited to, a surround sound system, an audio amplifier, a stereo, or the like.

At times, the presentation of the video stream 104 and the audio stream 106 may not be sufficiently synchronized. Such unsynchronized presentation of the video stream 104 and the audio stream 106 may be very distracting to the user.

The unsynchronization between the video stream 104 and the audio stream 106 may occur in the originally provided media content stream 118 (that includes the video stream 104 and the audio stream 106) received over a communication network 120. For example, there may be transmission delays between the communicated video stream 104 and audio stream 106. Components in the media device 102 may introduce delays in one of the audio stream 106 or the video stream 104, thereby causing the unsynchronized presentation of the video stream 104 and the audio stream 106.

In some instances, the unsynchronization between the video stream 104 and the audio stream 106 may occur when the video stream 104 and audio stream 106 are presented by different media presentation devices 108, such as when the video stream 104 is presented on the television 110 and the audio stream 106 is presented on the sound system 114. The different media presentation devices 108 may use different components to process the video stream 104 and the audio stream 106. Different time delays may be introduced by the components in the different media presentation devices 108, thereby causing the unsynchronized presentation of the video stream 104 and the audio stream 106.

In another instance, the unsynchronization between the video stream 104 and the audio stream 106 may occur in the originally provided media content stream 118. For example, when the media content stream 118 is received over the communication network 120 sourced by a media content provider system 122, the video stream 104 and the audio stream 106 may become unsynchronized during the origination of the media content stream 118 to the media device 102.

Embodiments of the video and audio synchronization system 100 are configured to permit the user, who is actively viewing a presentation of the video stream 104 and who is listening to a corresponding synchronized audio stream 106, to initiate an incremental change in the synchronization between the video stream 104 and the audio stream 106. Accordingly, the user is able to control synchronization between the video stream 104 and the audio stream 106 to reduce, and even eliminate, an unsynchronized presentation of the video stream 104 and the audio stream 106.

In some situations, the user may perceive that the audio stream 106 is being presented ahead of (before) the video stream 104. In an exemplary embodiment, presentation of the video stream 104 may be advanced (speeded up) to synchronize the video stream 104 with the audio stream 106 to correct, or at least mitigate, the unsynchronized presentation of the video stream 104 and the audio stream 106. Alternatively, or additionally, an exemplary embodiment may retard (slow down) the presentation of the audio stream 106 to synchronize the audio stream 106 with the video stream 104.

In some situations, the user may perceive that the audio stream 106 is being presented behind (after) the video stream 104. In an exemplary embodiment, presentation of the video stream 104 may be retarded (slowed down) to synchronize the video stream 104 with the audio stream 106 to correct, or at least mitigate, the unsynchronized presentation of the video stream and the audio stream. Alternatively, or additionally, an exemplary embodiment may advance (speed up) presentation of the audio stream 106 to synchronize the audio stream 106 with the video stream 104.

To facilitate disclosure of embodiments of the video and audio synchronization system 100, a simplified embodiment of a media device 102 is described. The media device 102 may be a set top box or the like that is configured to receive streaming media content from a communication network 108. The media content stream 118, comprising the presented video stream 104 and the audio stream 106, is provided from the media content provider system 122. For example, the media content provider system 122 may be operated by a company that provides many channels of media content, even thousands of channels of media content, to its customers over the communication network 120. Non limiting examples of the communication network 120 include a satellite system, a cable system, and/or another network that the media device 102 is communicatively coupled to. Alternatively, or additionally, the communication network 120 may be an Internet site or web site operated by a company that provides Internet-based media content. Accordingly, exemplary communication network 120 may include, but are not limited to, satellite systems, cable systems, and the Internet.

Alternatively, or additionally, the media content stream 118 may be provided from another electronic device or component that is communicatively coupled to the media device 102. For example, the media content stream 118 may be provided from an electronic device that accesses a portable media content storage medium. Non-limiting examples of such media devices include, but are not limited to, a video recording cassette (VCR), a digital video disk (DVD), a flash memory, or other media content storage medium.

In this context, the media device 102 is illustrated as being communicatively coupled to the television 110 that presents the video stream 104 on its display 112. The media device 102 is also illustrated as being communicatively coupled to the sound system 114 that presents the audio stream 106 on a plurality of speakers 116. In this exemplary configuration, an unsynchronized presentation of the video stream 104 presented on the display 112 and the audio stream 106 emitted from the speakers 116 may be discernable by the user.

The non-limiting simplified exemplary media device 102 comprises a media content stream interface 124, a processor system 126, a memory 128, a program buffer 130, an optional digital video recorder (DVR) 132, a presentation device interface 134, a remote interface 136, and an optional user input interface 138. The memory 128 comprises portions for storing the media content processing logic 140, the video adjustment logic 142, and the audio adjustment logic 144. In some embodiments, the media content processing logic 140, the video adjustment logic 142, and/or the audio adjustment logic 144 may be integrated together, and/or may be integrated with other logic. Other media devices 102 may include some, or may omit some, of the above-described media processing components and/or logic. Further, additional components and/or logic not described herein may be included in alternative embodiments.

The functionality of the media device 102, here a set top box, is now broadly described. The media content processing is generally implemented by the processor system 126 while executing the media content processing logic 140. A media content provider may provide the media content stream 118 that is received by the media content stream interface 124. One or more tuners 146 in the media content stream interface 124 selectively tune to a specified media content stream 118 in accordance with instructions received from the processor system 126. The processor system 126, executing the media content processing logic 140 and based upon a request for a program of interest specified by the user, parses out the video stream 104 and the audio stream 106 associated with the program of interest. The video stream 104 and the audio stream 106 may be temporarily stored by the program buffer 130 to facilitate the timing of the communication of the video stream 104 and the audio stream 106 to the media presentation devices 108. The media content can be streamed out to the media presentation devices 108 via the presentation device interface 134. Alternatively, or additionally, the parsed out media content may be saved into the DVR 132 for later presentation.

The exemplary media device 102 is configured to receive commands from the user via a remote control 148. The remote control 148 includes one or more controllers 150. The user, by actuating one or more of the controllers 150, causes the remote control 148 to generate and transmit commands, via a wireless signal 152, to the media device 102 and/or the media presentation devices 108. The commands control the media device 102 and/or control the media presentation devices 108. The wireless signal 152 may be an infrared signal or a radio frequency (RF) signal.

Typically, the video stream 104 and the audio stream 106 are closely synchronized during presentation on the media presentation devices 108. In the event that there is some degree of unsynchronized presentation between the video stream 104 and the audio stream 106, the amount or degree of unsynchronization will likely be relatively small. Generally, the amount or degree of unsynchronization will likely be on the order of a plurality of milliseconds. Accordingly, embodiments of the video and audio synchronization system 100 are configured to permit the user to incrementally advance or retard a selected one of the video stream 104 or the audio stream 106 by a predefined duration. In response to initiation of a synchronization correction by the user, embodiments of the video and audio synchronization system 100 advance or retard a selected one of the video stream 104 and/or the audio stream 106 by the predefined duration of the synchronization correction (interchangeably referred to herein as a synchronization correction duration).

To conceptually illustrate operation of an embodiment of the video and audio synchronization system 100, assume that the predefined synchronization correction duration by which the video stream 104 or the audio stream 106 is advanced or retarded is five (5) milliseconds. Further, assume that the amount or degree of unsynchronization corresponds to mismatch of seventeen (17) milliseconds between the presentation of the video stream 104, and assume that the video stream 104 is presented ahead of the audio stream 106. Here, the user would hear the dialogue of the speaking actor 17 milliseconds after seeing the corresponding movement of the actor's lips.

In this example, the user may generate a first synchronization correction instruction or request to the media device 102 (or other electronic device or media presentation device 108 having an embodiment of the video and audio synchronization system 100 therein) to retard the video stream 104. In response, presentation of the video stream 104 is retarded by 5 milliseconds. Alternatively, presentation of the audio stream 106 may be advanced by 5 milliseconds. After the first synchronization correction, the mismatch is reduced to 12 milliseconds.

If the unsynchronized presentation of the video stream 104 and the audio stream 106 is still undesirable, the user may generate a second synchronization correction instruction or request to the media device 102 (or other electronic device or media presentation device 108 having an embodiment of the video and audio synchronization system 100 therein). In response, presentation of the video stream 104 is again retarded by 5 milliseconds. Alternatively, presentation of the audio stream 106 may again be advanced by 5 milliseconds. After the second synchronization correction, the mismatch is reduced to 7 milliseconds. At this point, the presentation of the video stream 104 and the audio stream 106 may be sufficiently synchronized so as to be acceptable to the user.

However, if the unsynchronized presentation of the video stream 104 and the audio stream 106 is still undesirable, the user may generate a third synchronization correction instruction or request to the media device 102 (or other electronic device or media presentation device 108 having an embodiment of the video and audio synchronization system 100 therein). In response, presentation of the video stream 104 is again retarded by 5 milliseconds. Alternatively, presentation of the audio stream 106 may again be advanced by 5 milliseconds. After the second synchronization correction, the mismatch is reduced to 2 milliseconds. A 2 millisecond difference between presentation of the video stream 104 and the audio stream 106 is not likely to be perceptible to the user.

However, the user might generate a fourth synchronization correction instruction or request to the media device 102 (or other electronic device or media presentation device 108 having an embodiment of the video and audio synchronization system 100 therein). In response, presentation of the video stream 104 is again retarded by 5 milliseconds. Alternatively, presentation of the audio stream 106 may again be advanced by 5 milliseconds. After the fourth synchronization correction, the mismatch changes such that the user would hear the dialogue of the speaking actor 3 milliseconds before seeing the corresponding movement of the actor's lips. The user may elect to then generate a fifth synchronization correction instruction to reverse the last synchronization correction. Some embodiments may allow the user to change the predefined duration of the synchronization correction. For example, the user might choose to set the duration to 3 milliseconds, and then generate a fifth synchronization correction instruction to reverse the last synchronization correction such that the video stream 104 and the audio stream 106 are exactly synchronized.

The user may generate the synchronization correction instruction or request to the media device 102 (or other electronic device or media presentation device 108 having an embodiment of the video and audio synchronization system 100 therein) in a variety of manners. An exemplary embodiment utilizes a designated one or more of the controllers 150 to cause the remote control 148 to generate and transmit commands, via the wireless signal 152, to the media device 102 (or other electronic device or media presentation device 108 having an embodiment of the video and audio synchronization system 100 therein). For example, one of the controllers 150 may be configured to retard the video stream 104 (or advance the audio stream 106) by the predefined duration of the synchronization correction. Another one of the controllers 150 may be configured to advance the video stream 104 (or the retard audio stream 106) by the predefined duration of the synchronization correction.

Alternatively, or additionally, the user may actuate a controller (not shown), such as a button or the like, coupled to the user input interface 138 to initiate a synchronization correction. The controller may reside on a surface of the media device 102 (or other electronic device or media presentation device 108 having an embodiment of the video and audio synchronization system 100 therein).

Alternatively, or additionally, a user may operate the remote control 148 (or controllers on the media device 102 or other device) to cause presentation of a synchronization correction graphical user interface (GUI) 154 on a display. For example, the synchronization correction GUI 154 may be presented on the display 112 of the illustrated television 110. In an exemplary embodiment, the synchronization correction GUI 154 has the look and feel of a table or the like presenting information describing available synchronization correction options (advance the video stream 104 or the audio stream 106, retard the video stream 104 or the audio stream 106, change the predefined duration of the synchronization correction, select a duration of the synchronization correction, etc.). The synchronization correction GUI 154 is interactive with the viewer. The user, via their remote control 148 or controllers on the media device 102, is able to "scroll" or "navigate" about the synchronization correction GUI 154 to select a synchronization correction of interest. When the user highlights a portion of the synchronization correction GUI 154 corresponding to a synchronization correction of interest, the user may actuate one or more controllers 150 to cause the media device 102 (or other electronic device or media presentation device 108 having an embodiment of the video and audio synchronization system 100 therein) to perform a synchronization correction.

Embodiments of the video and audio synchronization system 100 may advance and/or retard a selected one of the video stream 104 or the audio stream 106 by a predefined duration using one or more techniques. To advance or retard the video stream 104, the video adjustment logic 142 is retrieved and executed by the processor system 126 in cooperation with the media content processing logic 140. To advance or retard the audio stream 106, the audio adjustment logic 144 is retrieved and executed by the processor system 126 in cooperation with the media content processing logic 140.

An exemplary embodiment may use time shifting and/or pitch shifting to adjust the audio stream 106 by the duration of a synchronization correction. If presentation of the audio stream 106 continues during the synchronization correction, pitch shifting and/or other audio processing may be used to present a more pleasing presented audio stream 106 with a less perceptible distortion. Any suitable technique may be used to adjust the audio stream 106 to advance or retard the audio stream 106 for synchronization with the video stream 104. Time compression or expansion may be used. A suitable phase vocoder method may be used. A suitable Fourier transform method may be used. A suitable time domain harmonic scaling method may be used. A suitable resampling process may be used. An adaptive basis transform algorithm may be used.

An exemplary embodiment may use image frame processing techniques to advance presentation of the video stream 104 by the duration of a synchronization correction. Any suitable technique may be used to advance the video stream 104 for synchronization with the audio stream 106. To advance presentation of the video stream 104, an exemplary embodiment discards one or more selected image frames of the video stream 104, wherein the presentation time of the selected plurality of image frames corresponds to the predefined duration of the synchronization correction. Selection of image frames for discarding may be based on the time or duration between frames so that the number of discarded image frames corresponds to the duration of the synchronization correction. When an image frame is discarded, that discarded image frame is not presented, and then presentation of the subsequent image frames of the video stream then continues. Rather, the presentation jumps ahead to a next presented image frame.

Image frames may be selected for discarding based on the content and/or type of the image frame. For example, in a moving picture experts group (MPEG) formatted stream of image frames, intra-coded frames (I-frames) may be retained and a number of predictive-coded frames (P-frames) and/or bidirectionally-predictive-coded frames (B-frames) may be selected for discarding. Accordingly, I-frames associated with the discarded P-frames and/or B-frames remain in the video stream Alternatively, or additionally, an image frame may be selected for discarding based upon the amount of video information of that image frame. For example, one of the P-frames may have less video information than an adjacent or close-by P-frame. The P-frame having less video information may be selected for discarding. In an exemplary embodiment, a image frame for discarding is identified from a plurality of adjacent image frames in the video stream, wherein the selected image frames have the least amount of video information therein.

Alternatively, or additionally, the temporal relationship between image frames may be used to select image frames for discarding. For example, but not limited to, every other image frame may be selected for discarding. As another example, groups of adjacent image frames may be selected for discarding. For example, a group of three adjacent frames may be selected for discarding. Presentation may then resume. If additional synchronization correction, another group of image frames would be selected for discarding.

An exemplary embodiment may use image frame processing techniques to retard presentation of the video stream 104 by the duration of a synchronization correction. Any suitable technique may be used to retard the video stream 104 for synchronization with the audio stream 106. To retard presentation of the video stream 104, an exemplary embodiment duplicates selected image frames of the video stream 104. Duplicated image frames may be inserted into the video stream 104 to effectively retard presentation of the remainder of the video stream 104. The duplication and insertion process continues until a sufficient number of image frames are duplicated and inserted so that the delay in presentation of the video stream 104 corresponds to the duration of the synchronization correction.

In an exemplary embodiment, one image frame is selected for duplication. The selected image frame is duplicated into a plurality of duplicated image frames, wherein a presentation time of the selected plurality of duplicated image frames corresponds to the predefined duration of the synchronization correction.

In another embodiment, a plurality of non-adjacent image frames are selected for duplication, wherein the selected non-adjacent image frames are separated by a predefined duration or by a predefined number of image frames. For example, selected non-adjacent image frames may be separated by approximately half of a millisecond. As another example, every other image frame (or every third image frame, or every fourth image frame, etc.) may be selected for duplication. Each selected non-adjacent image frame may be duplicated one, twice or by some other predefined number of duplications. The duplicated non-adjacent image frames are inserted into the video stream adjacent to their respective image frame from which they were duplicated from. Accordingly, the presentation time of the selected plurality of duplicated image frames corresponds to the predefined duration of the synchronization correction.

Selection of image frames for duplicating may be based on the time or duration between frames so that the number of duplicated image frames corresponds to the duration of the synchronization correction. Image frames may be selected based on the content and/or type of the image frame. For example, in a moving picture experts group (MPEG) formatted stream of image frames, one or more of the I-frames, P-frames, and/or B-frames may be selected for duplication.

Alternatively, or additionally, an image frame may be selected based upon the amount of video information of that image frame. For example, one of the P-frames may have less video information than an adjacent or close-by P-frame, and thus, may be more quickly duplicated. The P-frame having less video information may be selected for duplication.

Alternatively, or additionally, the temporal relationship between image frames may be used to select image frames for duplicating. In an exemplary embodiment, a series of consecutive image frames may each be selected for duplicating one or more times. For example, but not limited to, a single image frame may be duplicated a predefined number of times and inserted into the video stream 104. As another example, a selected image frame may be duplicated two times, and inserted into the video stream 104. Then, a later image frame may be selected and duplicated two times, and inserted into the video stream 104.

In some embodiments, a relatively small, predefined time delay may be added into the video stream 104 between communication and/or presentation of a plurality of image frames. A sum of the time delays corresponds to the predefined duration of the synchronization correction. The time delay may be added between a series of adjacent image frame in an exemplary embodiment. Alternatively, the time delay may be added between groups of adjacent image frames. For example, if a 5 millisecond duration of the synchronization correction is desired, five 1 millisecond time delays may be inserted into the video stream 104 at desired locations.

In some embodiments, the time delay may implemented by a series of generated solid blank or patterned image frames. The blank image frames may be a colored, such as black, white, grey, blue or another suitable color that may not be significantly perceptible by the user. In an exemplary embodiment, a primary color or substantial color of an selected image frame in the video stream may be identified, wherein the identified color of the selected image frame is used to define the color of the blank image frame. For example, the video scene may have been filmed during the day at a location where the sky was blue. Accordingly, a substantial color of the image frame is blue such that the selected color of the blank image frame would be blue. The sum of the presentation times of the generated image frames corresponds to the predefined duration of the synchronization correction. The generated image frames may be inserted together as a group into the image frame. Alternatively, the generated image frames may be periodically inserted so as to be spaced among the plurality of image frames of the video stream. The generated image frames are preferably inserted at locations in the video stream so as to result in an acceptable level of distraction to the user.

FIG. 2 is a block diagram of an alternative embodiment of the video and audio synchronization system 100 that is configured to support communications between the media device 102 and the media content provider system 122 concerning unsynchronized presentation of the video stream 104 and the audio stream 106. An exemplary embodiment of the media device 102 comprises a media content system interface 302 that is configured to support communications over a communication path 304.

The memory 128 comprises a portion for storing the synchronization correction information logic 306. The synchronization correction information logic 306 is retrieved and executed by the processor system 126, optionally in cooperation with the media content processing logic 140, to determine the synchronization correction information and/or to facilitate communication of the synchronization correction information between the media device 102, the media content provider system 122, and/or another entity. In some embodiments, synchronization correction information logic 306, the media content processing logic 140, the video adjustment logic 142, and/or the audio adjustment logic 144 may be integrated together, and/or may be integrated with other logic.

In an exemplary embodiment, the communication path 304 communicatively coupled the media device 102 to the communication network 120. The communication path 304 may employ any suitable communication media. For example, the same coaxial cable used to deliver media content to the media device 102 may also be used to support communications between the media device 102, the media content provider system 122, and/or another entity 308. As yet another example, the communication path 304 may communicatively coupled to the media device 102 to a telephone system, wire-based backchannel, or the like. As another non-limiting example, the communication path 304 may wirelessly communicatively couple the media device 102 to a suitable cellular system, the Internet, and/or a Wi-Fi system.

In an exemplary embodiment, when the user initiates a synchronization correction, the synchronization correction information corresponding to the synchronization correction is communicated from the media device 102 to the media content provider system 122 (or to any other suitable designated system, device, or entity 308). The synchronization correction information may include information pertaining to the nature of the synchronization correction, such as the predefined duration and/or any user specified duration of the synchronization correction, which one of the video stream 104 and the audio stream 106 for which the synchronization correction was applied, which direction the synchronization correction was made (advance or retard), and/or the number of times that the user initiated the synchronization correction.

The synchronization correction information may include information that identifies the particular media device 102. Identifying information may include, but is not limited to, a serial number, an account number, a user identity, a device location, or any other suitable identifying information.

The synchronization correction information may include information that may be used to determine the source of the unsynchronized presentation of the video stream 104 presented on the display 112 and the audio stream 106 emitted from the speakers 116. For example, information may be provided to determine if the signal transmission to the media device 102 is introducing error (and thus be indicative of a media content system transmission problem that should be corrected by the media content provider). The synchronization correction information may indicate if the media device 102 is introducing the error. For example, the media device is a STB might be supplied by the media content provider, and thus indicate that the media device 102 should be serviced and/or replaced by the media content provider. As yet another example, the synchronization correction information may indicated if the error is introduced by the owner's own equipment. Thus, the media content provider might advise the user of potential corrective actions.

The received synchronization correction information may be saved by the media content provider for other types of analysis. For example, many users might be experiencing the same, or similar, unsynchronized presentation of the video stream 104 the audio stream 106. If many users are experiencing the same or similar synchronization problem, the media content provider may be prompted to check performance of their equipment. Or, it may be possible that the originating provider is providing an unsynchronized video stream 104 and audio stream 106 to the media content provider. In such situations, the media content provider may prompt the media content originator to correct the synchronization problem, and/or may take actions to correct the synchronization problem at their facilities.

Some embodiments of the media device 102 are configured to provide other information to the media content provider or another entity. For example, the media device 102 may be provisioned with a set top box health reporting system or the like. Or, the media device may be provisioned with a program monitoring system that is used to obtain information about the user's viewing habits. The synchronization correction information logic 306 may be optionally integrated with the logic that performs these other reporting functions.

An exemplary embodiment may be configured to receive synchronization information from the media content provider. For example, an exemplary embodiment may receive information from the media content provider that there is a local or regional problem in the synchronization between the video stream 104 and the audio stream 106 for one or more media content streams 118. The received synchronization information may recommend that the user initiate one or more synchronization corrections at their media device 102 (or other electronic device or media presentation device 108 having an embodiment of the video and audio synchronization system 100 therein). For example, the synchronization information may recommend a duration of a synchronization correction (where the user adjusts the duration of the synchronization correction). As another non-limiting example, the media content provider may recommend a number of synchronization corrections based on a predefined duration of a synchronization correction). The synchronization correction information may identify which one or more media content streams 118 are having synchronization problems. Alternatively, or additionally, the media content provider may recommend no action be taken by the user since the media content provider is in the process of, or planning to, implement a synchronization correction to the media content stream 118.

Some embodiments are configured to generate an audio/visual (A/V) synchronization notification 310 that is presented to the user. For example, but not limited to, the AV synchronization notification 308 may be generated by the media device 102, and then may be communicated to the television 110 for presentation on the display 112. Alternatively, or additionally, an audible notification may be generated and presented to the user. The AV synchronization notification 310 may include the synchronization correction information, or a summary thereof, that was obtained from other media devices 102.

An exemplary embodiment presents the AV synchronization notification 310 as a pop-up window or the like. Alternatively, or additionally, the AV synchronization notification 310 may be incorporated into the synchronization correction GUI 154.

Alternatively, or additionally, the synchronization correction information received by the media content provider may be included with call center information, or may be made available to a call center. For example, the synchronization correction information could be incorporated into a data reporting system that is used by a call center in providing call support services to the client users. Here, the user may notice a synchronization problem between the video stream 104 and the audio stream 106. The user may call the call center and indicate the problem to the call center operator. The call center operator may then be able to advise the user of a recommended synchronization correction.

An alternative embodiment of the video and audio synchronization system 100 may be implemented in any suitable media presentation device 108. For example, an embodiment of the video and audio synchronization system 100 may be implemented in the sound system 114 to control the audio stream 106 to independently synchronize the audio stream 106 with the video stream 104 presented on a different media presentation device 108. As another example, an embodiment of the video and audio synchronization system 100 may be implemented in the television 110 to control the audio stream 106 to independently synchronize the audio stream 106 with the presented video stream 104 presented on its display 112. Alternatively, or additionally, the television 110 may be configured to control the video stream 104 to independently synchronize the video stream 104 with the audio stream 106 that is presented on a different media presentation device 108, such as the sound system 114.

As yet another exemplary alternative embodiment, an embodiment of the video and audio synchronization system 100 may be implemented in an external media device that is providing the media content stream 118. For example, the media content stream 118 may be originating from a DVD, VCR tape, or other content device. The media content stream 118 may be provided to the media device 102 directly, or directly to one or more media presentation devices 108. The user may adjust the video stream 104 and/or the audio stream 106 at the external device so as to synchronize presentation of the video stream 104 and the audio stream 106 that are presented on one or more media presentation devices 108.

It should be emphasized that the above-described embodiments of the video and audio synchronization system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
a program content stream interface configured to receive a media content stream, the media content stream comprising a video stream and an audio stream;
a remote interface configured to receive wireless signals transmitted from a remote control,
wherein a wireless signal from the remote control is received at the remote interface and corresponds to a user initiated synchronization correction instruction; and
wherein the synchronization correction instruction corresponds to a specification of a predefined synchronization correction duration; and
a memory configured to store the predefined synchronization correction duration, wherein the synchronization correction information specifies a predefined duration;
a processor system communicatively coupled to the program content stream interface, the memory and the remote interface, and configured to:

retrieve the synchronization correction information from the memory of the media device in response to receiving the user initiated synchronization correction instruction; and incrementally adjust one of the video stream and the audio stream by a synchronization correction, wherein the synchronization correction adjusts presentation of the video stream with respect to the audio stream by the predefined duration that is retrieved in response to receiving the synchronization correction instruction.

2. The media device of claim 1, wherein the processor system when operating to advance presentation of the audio stream is further configured to:

retard presentation of the video stream by the predefined duration when presentation of the video stream is ahead of presentation of the audio stream, and advance presentation of the video stream by the predefined duration when the presentation of the video stream is behind the presentation of the audio stream.

3. The media device of claim 1, wherein the processor system when operating to advance presentation of the audio stream is further configured to:

advance presentation of the audio stream by the predefined duration when presentation of the video stream is ahead of presentation of the audio stream, and retard presentation of the audio stream by the predefined duration when the presentation of the video stream is behind the presentation of the audio stream.

4. The media device of claim 3, wherein the processor system when operating to advance presentation of the audio stream is further configured to:

reduce a pitch of the audio stream during advancement of the audio stream.

5. The media device of claim 1, further comprising:

a presentation device interface configured to communicatively couple the media device to at least one media presentation device, wherein the audio stream and the video stream are communicated to the at least one media presentation device for presentation to a user, wherein presentation of the audio stream is unsynchronized with presentation of the video stream by at least a first duration, and wherein the first duration of unsynchronized presentation is greater than the predefined duration.

6. The media device of claim 1, wherein the video stream comprises a series of intra-coded (I-frames), predictive-coded frames (P frames), and bidirectionally-predictive-coded frames (B-frames), and wherein the processor system when operating to retard presentation of the video stream is further configured to:

select a first plurality of image frames for discarding by identifying a first I-frame in the video stream that is received after the user initiated synchronization correction instruction is received, by then selecting a predefined number of first P-frames associated with the identified first I-frame, and then by discarding the selected predefined number of first P-frames;

compare a duration associated with the discarded predefined number of first P-frames and the predefined duration of the synchronization correction;

continue presentation of the media content stream at the next video frame following the last one of the discarded predefined number of first P-frames in response to the duration associated with the discarded predefined number of first P-frames being at least equal to the predefined duration of the synchronization correction; and where in response to the duration associated with the discarded predefined number of first P-frames being less than the predefined duration of the synchronization correction, select a second plurality of image frames for discarding by identifying a second I-frame in the video stream that is received after the first I-frame, by then selecting a predefined number of second P-frames associated with the identified second I-frame, and by then discarding the selected predefined number of second P-frames.

7. The media device of claim 2, wherein when the processor system retards presentation of the video stream by the predefined duration, the processor system is further configured to:

select at least one image frame from a plurality of image frames of the video stream;

duplicate the selected image frame into a plurality of duplicated image frames, wherein a sum of presentation times of the selected plurality of duplicated image frames corresponds to the predefined duration of the synchronization correction;

insert the plurality of duplicated image frames into the video stream; and communicate subsequent image frames of the video stream to the display.

8. The media device of claim 2, wherein when the processor system retards presentation of the video stream by the predefined duration, the processor system is further configured to:

select a plurality of non-adjacent image frames from a plurality of image frames of the video stream;

duplicate the selected plurality of non-adjacent image frames, wherein a sum of presentation times of the duplicated non-adjacent image frames corresponds to the predefined duration of the synchronization correction;

insert the plurality of duplicated non-adjacent image frames into the video stream, wherein each non-adjacent duplicated image frame is inserted adjacent to its respective image frame; and communicate subsequent image frames of the video stream to the display.

9. The media device of claim 8, wherein when the processor system duplicates the selected plurality of non-adjacent image frames, the processor system is further configured to:

duplicate each of the selected plurality of non-adjacent image frames two times; and insert the two duplicated non-adjacent image frames adjacent to their respective image frame.

10. The media device of claim 2, wherein when the processor system retards presentation of the video stream by the predefined duration, the processor system is further configured to:

add a predefined time delay between the communication of a plurality of image frames, wherein a sum of the time delays corresponds to the predefined duration of the synchronization correction; and communicate subsequent image frames of the video stream to the display.

11. The media device of claim 10, wherein when the processor system adds the predefined time delay between the communication of a plurality of image frames, the processor system is further configured to:

add the predefined time delay between adjacent ones of the plurality of image frames.

12. The media device of claim 2, wherein when the processor system retards presentation of the video stream by the predefined duration, the processor system is further configured to:
- generate a plurality of image frames, wherein a sum of presentation times of the generated image frames corresponds to the predefined duration of the synchronization correction;
- insert the plurality of generated image frames into the video stream; and
- communicating subsequent image frames of the video stream to the display.

13. The media device of claim 12, wherein the generated image frame is defined by a color.

14. The media device of claim 1, wherein the wireless signal is a second wireless signal that is received after a first wireless signal, and wherein the first wireless signal is received from the remote control and corresponds to a user specification of the predefined synchronization correction duration.

* * * * *